United States Patent [19]

Hoeh, deceased

[11] 4,288,239
[45] Sep. 8, 1981

[54] METHOD OF MAKING A CONVOLUTED TUBULAR ENVELOPE FOR A COMPACT ELECTRIC DISCHARGE LAMP

[75] Inventor: Frederick W. Hoeh, deceased, late of Livingston, N.J., by Inga Hoeh, executrix

[73] Assignee: Westinghouse Electric Corp., Pittsburgh, Pa.

[21] Appl. No.: 126,098

[22] Filed: Feb. 29, 1980

Related U.S. Application Data

[62] Division of Ser. No. 11,836, Feb. 13, 1979, abandoned.

[51] Int. Cl.³ ............................................. C03B 23/06
[52] U.S. Cl. ........................................ 65/110; 65/108
[58] Field of Search .................................. 65/108, 110

[56] References Cited

U.S. PATENT DOCUMENTS

| | | | |
|---|---|---|---|
| 1,763,071 | 6/1930 | Smalley | 65/108 X |
| 1,874,012 | 8/1932 | Hotchner | 65/108 X |
| 1,923,148 | 8/1933 | Hotchner | 65/108 X |
| 2,135,775 | 11/1938 | Walker | 65/110 |
| 2,691,853 | 10/1954 | Yoder | 65/108 X |
| 3,309,187 | 3/1967 | Drangeid | 65/108 X |
| 3,514,276 | 5/1970 | Fujio et al. | 65/108 X |
| 3,993,465 | 11/1976 | Hurx et al. | 65/110 |

FOREIGN PATENT DOCUMENTS

854745 11/1960 United Kingdom .

Primary Examiner—Arthur D. Kellogg
Attorney, Agent, or Firm—D. S. Buleza

[57] ABSTRACT

An efficient fluorescent lamp of high brightness and compact size is provided by forming the envelope from vitreous tubing that is bent into three U-shaped sections which are disposed in mutually perpendicular planes and define a single convoluted discharge channel. The U-shaped sections are so oriented that the legs of the U's are disposed in quadrangular columnar array with the ends of the tubing located adjacent one another and opposite one of the U-bends. Conventional electrode-stem assemblies are sealed into the ends of the bent tubing and the sealed legs are coupled to each other and the proximate U-bend by brace means which rigidifies the multi-section envelope. An efficient method of manufacturing the envelope employing a pair of arcuate molding components and two bending operations that form the three U-bends with only a single tube-heating operation is also disclosed.

7 Claims, 4 Drawing Figures

METHOD OF MAKING A CONVOLUTED TUBULAR ENVELOPE FOR A COMPACT ELECTRIC DISCHARGE LAMP

This is a division of application Ser. No. 011,836, filed Feb. 13, 1979, now abandoned.

CROSS-REFERENCE TO RELATED APPLICATIONS

This application discloses and claims a method of making a convoluted envelope for a compact fluorescent lamp of triple-U-bent configuration that is employed as the light source in the lighting apparatus disclosed and claimed in application Ser. No. 11,832 of H. Skwirut et al filed Feb. 13, 1979 and entitled "Screw-In Type Lighting Unit Having Convoluted Tridimensional Fluorescent Lamp," which application is assigned to the assignee of this application.

The present application is also related to design application Ser. No. 11,835 of F. W. Heoh (the deceased author of the present invention) filed Feb. 13, 1979 and entitled "Compact Fluorescent Lamp or Similar Article for a Lighting Unit", which application is also assigned to the assignee of this application and is now abandoned.

BACKGROUND OF THE INVENTION

1. Field of the Invention

This invention generally relates to electric discharge lamps and has particular reference to a method of forming the envelope for an improved fluorescent lamp of compact size and high brightness that is suitable for use as a light source in various kinds of residential and commercial lighting fixtures that are designed for incandescent type lamps.

2. Description of the Prior Art

Electric discharge lamps having tubular envelopes which provide "three-dimensional" type light sources are generally well known in the art. U.S. Pat. No. 2,652,483 granted Sept. 15, 1953 to Laidig et al. discloses fluorescent lamp units of helical configuration (FIGS. 7 and 15 embodiments) that are formed by coupling several semi-circular lamps together to form one operative assembly. Another fluorescent lamp of three-dimensional configuration that is formed by four sections of conventional fluorescent lamp tubing which are "bundled" together and interconnected by suitable apertures in the side walls of the respective tubes is disclosed in U.S. Pat. No. 3,501,662 issued Mar. 17, 1970 to Plagge.

Electric discharge lamps having tubular envelopes that are bent into various shapes to provide concentrated light sources are also known in the art. A double-ended type sodium-vapor discharge lamp having an envelope which is formed from a single tube that is folded or bent upon itself twice to provide three straight tubular segments that are disposed in parallel triangular-spaced relationship is disclosed in British Pat. No. 854,745 published Nov. 23, 1960 (FIGS. 3 and 4 embodiment). A luminous discharge tube designed for advertising and display purposes (or as a beacon light) and having an envelope formed from glass tubing which is bent upon itself eleven times to provide a corresponding number of U-shaped sections is disclosed in U.S. Pat. No. 1,898,615 granted Feb. 21, 1933 to Byrnes. Gaseous discharge devices consisting of a heat-conserving housing that encloses a lamp having a tubular envelope that is bent upon itself three times to provide four straight sections which are spaced from one another and arranged so that the electrode-containing ends of the envelope are located on opposite sides of one of the curved segments or bends is disclosed in U.S. Pat. Nos. 2,001,511 and 2,200,940 granted to Uyterhoeven et al.

In accordance with the more recent proposal, a screw-in type flourescent lamp of compact size is provided by suitably partitioning the interior of a cylindrical envelope or by making the envelope from tubing that is bent upon itself to provide a U-shaped bulb, and which may be additionally twisted into spiral shape or redoubled on itself to provide a generally M-shaped envelope. A fluorescent lamp constructed in this manner is disclosed in U.S. Pat. No. 3,551,736 granted Dec. 29, 1970 to Doehner (the M-shaped tubular envelope embodiment being shown in FIG. 5 and described along with the other aforementioned shapes at lines 24–30, column 2).

A method of making a circular-shaped fluorescent lamp by bending a straight tubular glass envelope around a suitable curved jig is disclosed in U.S. Pat. No. 3,993,465 granted Nov. 23, 1976 to Hurx et al.

SUMMARY OF THE INVENTION

While the prior art electric discharge lamps were functionally satisfactory insofar as they provided the desired physical compactness and light concentration by employing "three-dimensional" type envelopes, they were difficult and expensive to manufacture since they either required the use of a number of separate lamp or bulb components that were joined together, or utilized envelopes made from tubing which was bent in such a way that the electrode-containing ends of the tubing were located at opposite ends of the convoluted envelope or on opposite sides of one of its U-bent segments. This not only complicated the base and terminal structures required to connect the lamp electrodes with a suitable power source, but made it very difficult or impossible to provide the lamp with a screw-in type base which would permit the lamp to be used in lighting fixtures designed for incandescent type lamps. In addition, some of the prior art lamps also required tubular envelopes of such complex shape that their manufacture on a mass-production basis would be impractical from both a cost and quality standpoint.

The foregoing difficulties and problems are solved in accordance with the present invention by fabricating the envelope of the discharge lamp from a single piece of vitreous tubing that is bent into three conjoined U-shaped sections which are so oriented that the ends of the tubing which contain the electrodes are disposed adjacent one another in a common plane that does not intersect any of the U-bent segments of the envelope. This is accomplished by orienting the U-shaped sections of the envelope in such a manner that two of them are disposed in paired side-by-side relationship and are joined by the third U-shaped section which is inverted and located in a plane that is parallel to the plane containing the free ends of the tubing. The spatial relationship of the three U-shaped sections of the novel envelope is accordingly such that two of them form a pair of spaced hooks or "crooks" that are aligned with one another and have their tips laterally bent toward each other and joined by a U-bend which forms the third U-shaped section. The straight tubular legs of the U-shaped sections are thus disposed in rectangular columnar array and the free ends of the envelope are located proximate and on the same side of the U-bend which connects the tips of the paired "crooks."

The resulting triple-U-bent envelope is thus of three-dimensional configuration and, while very compact, still provides a single discharge channel that is more than four times the length of one of the straight legs of the convoluted envelope. The convoluted shape of the "dual-crooked" envelope thus provides a tortuous discharge path which is not only of sufficient length to permit the lamp to be operated efficiently at a practical power loading but is so configured that the electrodes are located at the same end of the envelope and so oriented that the envelope can readily be fitted with a screw-type base and still provide a lamp that is small enough to be used in lighting fixtures designed for incandescent type lamps.

The configuration of the triple-U-bent envelope also provides an air space between each of the U-shaped sections and a "chimney-like" central opening which prevents the lamp from becoming overheated, especially if it is operated at high power loadings in a confined environment. The "free-standing" orientation of the U-shaped sections also permits the envelope to be readily manufactured from glass tubing of the type employed for conventional flourescent lamps by heating the tubing to make it plastic and then subjecting it to two bending operations which rapidly form all of the U-bends while the glass tubing is still soft and pliable.

Since the electrode-containing ends of the envelope are located adjacent to one another and on the same side of the medial U-shaped section, these parts of the envelope can also be readily coupled to each other by suitable bracing means to rigidify the lamp and prevent the envelope from breaking while the finished lamp is being handled or shipped.

BRIEF DESCRIPTION OF THE DRAWINGS

A better understanding of the invention will be obtained from the exemplary embodiment shown in the accompanying drawings, wherein.

DESCRIPTION OF THE PREFERRED EMBODIMENT

While the present invention can be advantageously employed in various kinds of electric discharge lamps that are suited by virtue of their small physical size and high brightness for lighting homes or offices, it is particularly adapted for use in conjunction with the manufacture of low-pressure type discharge lamps such as fluorescent lamps and it has, accordingly, been so illustrated and will be so described.

Figure 1:
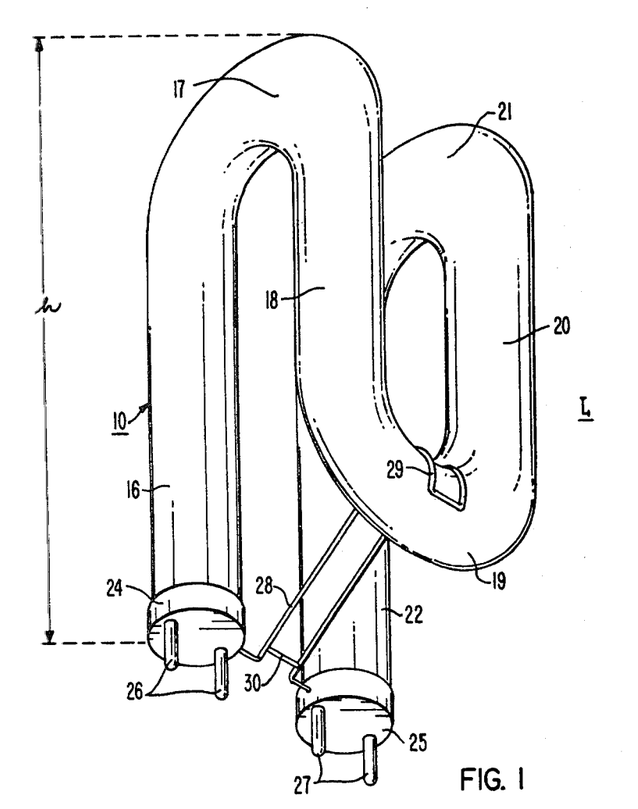
FIG. 1 is a pictorial view of a compact fluorescent lamp that employs a triple-U-bent envelope of the type produced by the invention.
Figure 2:
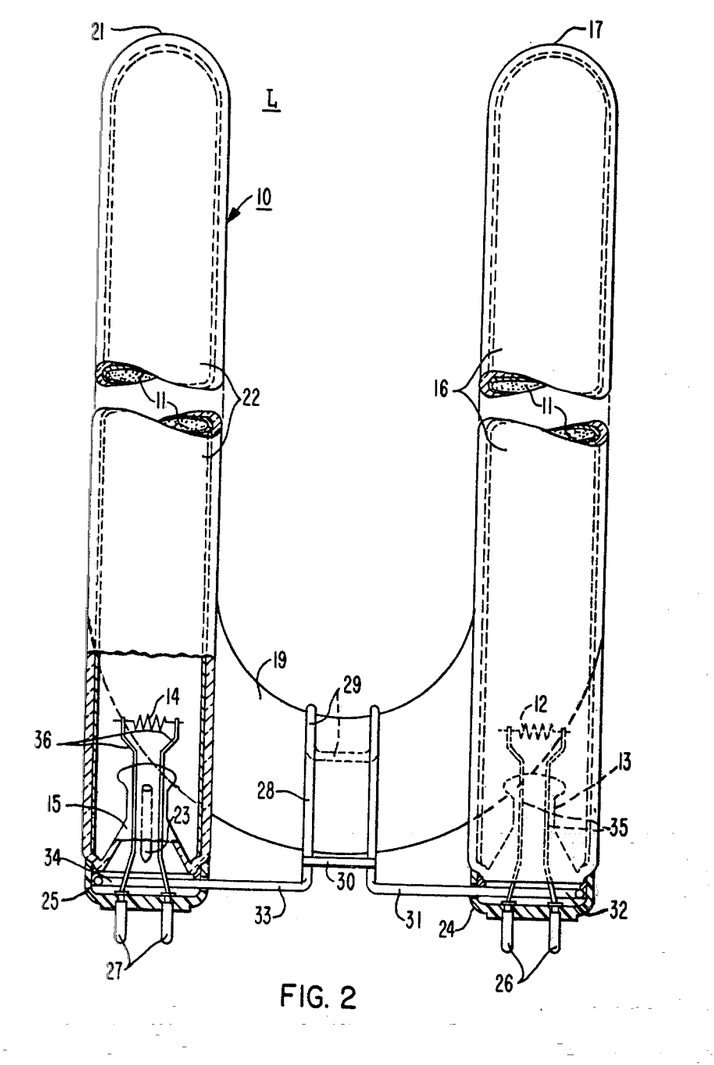
FIG. 2 is an enlarged front elevational view of the lamp shown in FIG. 1, portions of the envelope being removed for illustrative purposes.

The compact fluorescent lamp L shown in FIGS. 1 and 2 employs an envelope 10 that is composed of suitable light-transmitting vitreous material, such as glass tubing, and is shaped to provide a tortuous discharge channel which extends between a pair of electrodes 12 and 14 (see FIG. 2) sealed within the ends of the envelope. As will be noted, the tubular envelope 10 is bent upon itself three times in such a fashion that it has three generally U-shaped sections which are located in three different planes and oriented so that two of the sections are aligned with one another in paired side-by-side relationship and joined by the other U-shaped section which is inverted. One of the paired U-shaped sections is defined by a substantially straight tubular segment 16 that is joined by arcuate segment 17 to another straight tubular segment 18. Tubular segment 18, in turn, is joined by another arcuate segment 19 to another straight segment 20—thus forming a second U-shaped section that is located in a plane which is substantially normal to the plane of the first U-shaped section. Straight segment 20 is joined by a third arcuate segment 21 to another straight segment 22 and thereby forms a third U-shaped section that is located in a plane which is substantially normal to the plane of the second or medial U-shaped section and is substantially parallel to the plane of the first U-shaped section.

As shown most clearly in FIG. 1, each of the arcuate segments 17, 19 and 21 of the convoluted envelope 10 are U-bends of such curvature that the straight tubular segments 16, 18, 20, and 22 extend in the same direction and are disposed substantially parallel to one another in quadrangular and columnar-spaced array. The straight segments 16 and 22 which contain the lamp electrodes (and thus terminate the discharge channel and the envelope 10) are located proximate one another in a common plane that is substantially parallel to the plane of the inverted U-shaped section which is formed by the straight segments 18 and 20 and the medial U-bend 19. The straight tubular segments 16, 18, 20, and 22 are thus arranged in pairs that are located in four different planes which are so oriented that adjacent planes are mutually perpendicular to one another. As a result, the overall configuration of the triple-U-bent envelope 10 is such that it is generally cubical or tetrahedral in character. When the fluorescent lamp L is energized, the envelope 10 thus provides a three-dimensional light source which is very compact but still provides a single discharge channel that is considerably longer than four times the overall height dimension "h" of the convoluted envelope 10 and thus permits the lamp L to be operated very efficiently.

As will also be noted in FIG. 1, the straight leg segments 16 and 22 which terminate the envelope 10 and the discharge channel are fitted with suitable base members 24 and 25 that are secured to the sealed ends of the envelope by cement or other suitable means and carry a pair of terminals such as metal pins 26 and 27 that are connected to the respective electrodes. By virtue of the unique orientation of the three U-shaped envelope sections, the based ends of the straight segments or legs 16 and 22 of the envelope 10 are located on the same side of the U-bend segment 19 that constitutes part of the inverted U-envelope section. This spatial arrangement not only effectively makes the lamp L of single-ended construction (and thus greatly simplifies connecting the lamp to a suitable power source) but permits the envelope 10 to be easily rigidified and protected from breakage by a suitable bracing means such as a strut 28 fashioned from rigid wire or other suitable material. The strut is secured to the base members 24 and 25 and laterally extends to U-bend segment 19 to which it is coupled, as by a slip-interlock type of fit effected by an arcuate hook 29 that is provided at the end of the strut and grips the U-bend 19. As shown, the bracing strut 28 can be fabricated from a single piece of wire (or other rigid material) that is bent upon itself and prevented from flexing by a crosspiece 30 that is joined to the ends of the strut which are secured to the base members 24, 25.

As shown in the enlarged view of the fluorescent lamp L illustrated in FIG. 2, the triple-U-bent envelope 10 is provided with the customary inner coating 11 of a suitable phosphor material that converts the ultraviolet radiation produced by the discharge into visible radiation. The terminating legs or segments 16 and 22 of the envelope are hermetically sealed by stem assemblies 13 and 15 of conventional construction that are fused to the envelope and carry the thermionic electrodes 12 and 14. The electrodes comprise the usual tungsten wire coils that are coated with electron-emission material and are electrically connected by lead wires 35 and 36 to the pin terminals 26 and 27 of the respective base members 24, 25 fastened to the sealed ends of the envelope. In accordance with standard lamp-making practice, the envelope 10 contains a suitable ionizable medium such as a fill gas and a dose of mercury that are introduced into the envelope through a tubulation 23 that extends within stem 15 and is subsequently tipped-off and sealed in the usual manner. A suitable fill gas is argon at a pressure below about 10 Torr, and preferably about 3 Torr. The mercury dosage will vary according to the physical size of the envelope 10 and the power loading at which the lamp L is operated. The mercury dosage is sufficient to provide mercury vapor at a partial pressure of from about 6 to 10 millitorrs when the lamp is operated at its rated wattage.

While any suitable phosphor or admixed phosphors can be used to form the inner luminescent coating 11, in lighting applications where optimum visual clarity and color rendition of the illuminated objects or scene are required, coatings which contain a blend of three phosphors that emit visible radiations in three different selected regions of the spectrum (specifically, the wavelength regions of about 450 nm, 540 nm and 610 nm) are desirably employed to provide a so-called "prime color" fluorescent lamp, pursuant to the teachings of W. A. Thornton in the article entitled "Luminosity And Color-Rendering Capability Of White Light", Journal of the Optical Society of America, Volume 61, No. 9 (September 1971), pages 1155-1163. As a specific example, a suitable phosphor blend for a fluorescent lamp having such an enhanced light output contains manganese-activated zinc silicate, europium-activated strontium chlorophosphate, and europium-activated yttrium oxide phosphors—all of which are well known to those skilled in the art.

As illustrated in FIG. 2, the wire brace 28 has two laterally depending legs 31 and 33 that extend through suitable openings in the base members 24, 25 and are terminated by arcuate segments 32 and 34 which nestingly seat within the base collars and securely couple the brace to the based ends of the envelope 10. The hooked end 29 of the brace 28 slips over and interlocks with the U-bend segment 19 that is located opposite the based ends of the envelope, as previously described.

Figure 3:
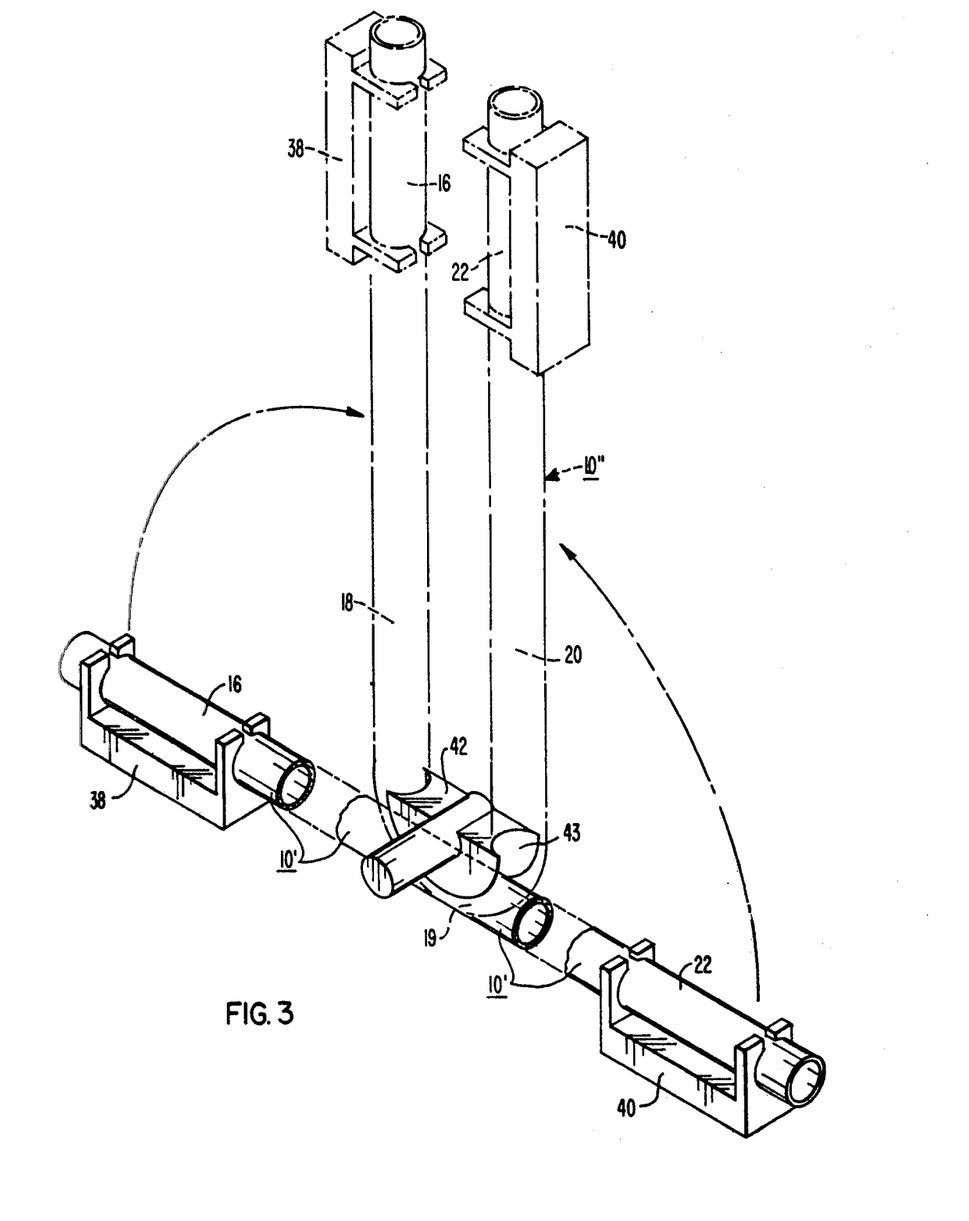
FIGS. 3 and 4 are simplified pictorial views illustrating the manner in which a straight piece of vitreous tubing is formed into a triple-U-bent lamp envelope by only two sequential bending operations in accordance with the invention.
Figure 4:
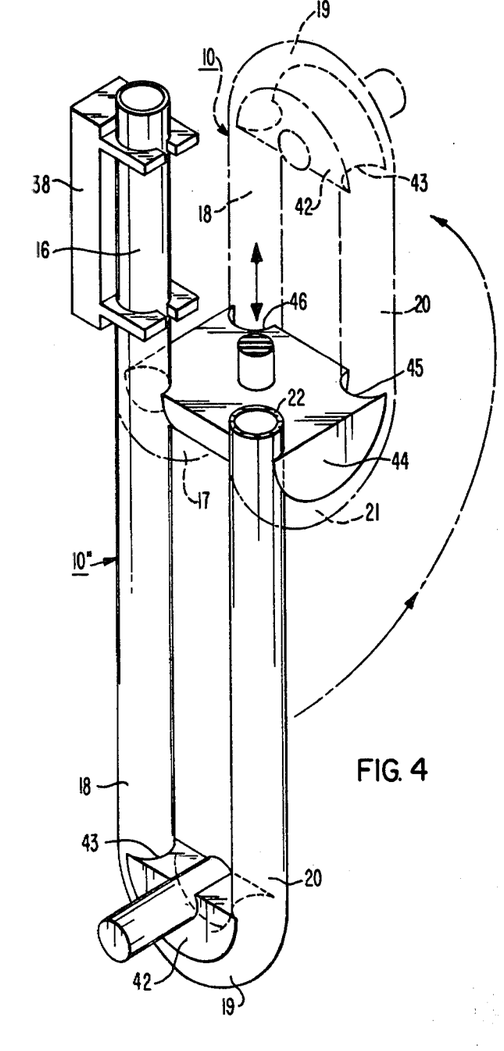

ENVELOPE MANUFACTURE (FIGS. 3 AND 4)

An important feature of the fluorescent lamp L is that the configuration of its convoluted envelope 10 is such that the envelope can be readily manufactured from a straight piece of glass tubing by only two bending operations (illustrated in FIGS. 3 and 4) and a single heating operation, all of which can be performed efficiently with automated machines. The first tube-bending operation is shown in FIG. 3 and consists of first placing a straight piece 10' of suitable glass tubing of predetermined length in a pair of holders 38, 40 which grip the end segments of the tubing and are swingable toward one another along arcuate paths (as indicated by the arrows) in a plane that is substantially aligned with and contains the tube axis. As a specific example, soda-lime glass tubing of the type conventionally used in the manufacture of fluorescent lamps can be employed. Such glasses are well known in the art and typically have a softening point in the order of 693° C., an annealing point of about 515° C., and a strain point of around 470° C.

After the glass tubing 10' is placed in the holders 38 and 40, the medial portion of the tubing extending between the holders 38 and 40 is heated by gas fires (or other suitable means) to a uniform temperature which softens the glass sufficiently to permit the tubing to be bent without fracturing or collapsing. A temperature of around 780° C. is suitable in the case of the aforementioned soda-lime type glasses. The center of the tubing 10' is then placed against the arcuate work surface of a preheated mold component 42, which surface is contoured to define a peripheral groove 43 that nestingly accommodates and effects a mechanical interlock with the tubing. While the glass is in its heat-softened condition, holders 38 and 40 are rapidly swung through an arc of approximately 90°, in the manner indicated by the arrows, thus bending the central part of the heated tubing 10' around the mold 42 and forming a U-bend 19 that transforms the straight tubing into a U-shaped tubular component 10" which has long leg sections that are substantially parallel to one another and of the same length. As indicated, the segments of the U-shaped tubing 10" immediately adjacent the U-bend 19 constitute the tubular segments 18 and 20 of the finished envelope 10, and the rigid end segments 16 and 22 of the tubing that are gripped by the holders 38 and 40 constitute the corresponding tubular segments which terminate the finished envelope.

The second bending operation is depicted in FIG. 4 and is begun immediately after the first bending operation is completed while the glass tubing is still in its heat-softened and plastic condition. As shown, the legs of the embryonic U-shaped envelope component 10" are seated against the edge of the working surface of another preheated mold component 44 that is reciprocally movable (as indicated by the arrows) and indexed into bridging position with both legs after the first bending operation has been completed. As will be noted, the working surface of the second mold 44 is also of arcuate configuration and contoured to provide a pair of channels or grooves 45 and 46 that are spaced to nestingly accommodate the legs of the U-shaped tube component 10" and thus serve as guides during the second bending operation.

Immediately after the U-shaped tube 10" is seated against the rim of mold 44, the holders 38 and 40 (along with the gripped tube ends 16 and 22) are held stationary and mold component 42 and the U-bent end 19 of the tube 10" are swung through an arc of approximately 180° (indicated by the arrow) along a plane that is substantially normal to the plane of the first bending operation, thereby effecting the second bending operation. As shown, the bending action is such that selected medial portions of both legs of the tube 10" are wrapped around the grooved portions of the second mold component 44 and formed into two additional U-bend segments 17 and 21 that are spaced from each other and disposed in substantially parallel-paired relationship. The mechanical interlock with the tube 10" effected by the grooved working surface of mold component 42 is such that mold component 42 grips the U-bend 19 sufficiently to permit the mold to apply the necessary torque to the tubing for the second bending operation when mold 42 is swung through the aforesaid arc. As will be noted from the phantom showing in FIG. 4, the second bending operation places the first-formed U-bend 19 adjacent the end segments 16 and 22 (the latter being cut away for illustrative purposes) and completes the formation of the finished convoluted tubular envelope 10.

While the glass tubing is still hot and plastic, a stream of inert gas (such as compressed air) is preferably introduced into one end of the tubing to produce a positive pressure and "round out" any deformities in the circular shape of the tubing which may have occurred during the bending operations, especially in the U-bent segments.

If the tubular envelope 10 is still in heat-softened condition, it is then subjected to a stream of cool air to set the tubing in its new shape. Mold component 42 is then lowered, rotated 180° and withdrawn. Mold component 44 is also manipulated to free it from U-bends 17 and 21 and withdrawn from the envelope 10. Holders 38 and 40 are opened and the released triple-U-bent envelope 10 is then transferred to a suitable annealing apparatus and subsequently subjected to the sealing-in operations, etc., required to transform it into a fluorescent lamp.

For ease of manufacture, the straight piece of glass tubing 10' is provided with an inner coating of phosphor (not shown in FIG. 3 or 4) before it is heated and subjected to the two bending operations. However, if optimum light output from the finished fluorescent lamp is desired, then the phosphor-coating operation is performed after a clear glass length of tubing is reshaped into the desired triple-U-bent configuration since this would increase the lumen output of the finished lamp by approximately 9%.

If the envelope 10 is to be made in the manner described above, it is imperative that the glass tubing 10' be uniformly heated to the proper temperature before the bending operations, and that all of the U-bends be made very rapidly before the glass begins to cool and rigidify.

Uniform heading of the medial portion of the tubing 10' is best accomplished by continuous rotation of the tubing on rollers over an open burner or in an oven which are designed to keep both ends of the tubing cool and rigid so that the heated tubing can be transferred to and gripped by the movable pair of holders 38 and 40.

The fact that the last two U-bends 17 and 21 are made simultaneously, pursuant to the invention, enables the tube-reshaping process to be performed in a very short period of time (in the order of from about 10 to 20 seconds)—before the glass has cooled to a point that the tubing begins to rigidify. In addition, the tube-holders 38 and 40 and the mold components 42 and 44 are so constructed that they can readily be made parts of a single machine having drive means, indexing units, etc., which actuate and move the holders and molds in the proper sequence automatically in a very precise and controlled manner—thus reducing the time required for the tube-bending operations to a minimum.

SPECIFIC EXAMPLE

Following is a specific example of a compact tridimensional fluorescent lamp which has a convoluted envelope formed in accordance with the present invention.

A conventional 40 watt fluorescent lamp having a T10 type envelope (approximately 32 mm. outside diameter) and an overall length (unbased) of about 4 feet (approximately 122 cms.), when bent into three U-shaped sections of substantially the same length and curvature, forms a generally rectangular convoluted lamp which has an overall height of about 9¾ inches (24.76 cms.) and a width dimension of about 5½ inches (13.97 cms.) along each side with a 3 inch (7.62 cms.) spacing between each of the adjacent legs of the U-bent sections. Since the lumen output (published) of a conventional 40 watt T10 rapid start lamp is 3200 lumens and the lamp has a published life of 18,000 hours, it will provide a triple-U-bent lamp of the foregoing dimensions that has the same useful life and only a slight decrease in lumen output (perhaps a loss of 350 lumens) due to the masking or light-blocking effect of the juxtaposed legs of the U-sections.

Hence, despite its very compact size (approximately 24½ cms. by 14 cms.), the aforementioned triple-U-bent lamp provides a light source which will produce about 2850 lumens at an efficacy of around 57 lumens per watt (when operated on a conventional rapid start ballast) that consumes about 10 watts) and have a useful life of approximately 18,000 hours. The cost savings and power-conservation advantages derived from such a convoluted fluorescent lamp are accordingly quite substantial compared to a 150 watt incandescent type lamp that produces around 2800 lumens at an efficacy of about 18 or 19 lumens per watt and has an average life (published) of only 750 hours.

As will be apparent to those skilled in the art, triple-U-bent lamps of the present invention can be fabricated from glass tubing of various diameters and lengths in accordance with the invention to provide a new family of compact tridimensional low-pressure discharge lamps that can be used as cost-saving and energy-saving replacements for incandescent lamps now used for general lighting applications in many different kinds of fixtures (table lamps, floor lamps, etc.).

I claim as my invention:

1. In the manufacture of an electric lamp, the method of forming an envelope of compact triple-U-bent configuration from vitreous tubing that is substantially straight, which method comprises the steps of;

heating a predetermined length of such substantially straight vitreous tubing in a manner such that the end segments thereof are rigid and the remainder of the tubing is uniformly softened sufficiently to be bent without fracturing or collapsing, gripping the rigid end segments of said tubing and swinging them toward one another along a common plane until the heat-softened medial portion of the tubing is bent through an arc such that the tubing is U-shaped, immediately placing heated mold means of arcuate configuration against the heat-softened leg portions of the U-shaped tubing and, while maintaining the gripped end segments of the tubing stationary, swinging the U-bent medial part of the tubing through an arc of approximately 180° along a path which is substantially normal to the plane of the first bending operation and thereby simultaneously bending both of the heat-softened leg portions around said mold means and forming two additional U-bends in the tubing which are aligned with one another and position the neck of the first-formed U-bend proximate the gripped end segments of the tubing, and then removing said mold means and cooling the resulting triple-U-bent tubular envelope to rigidify and set the vitreous tubing in such configuration.

2. The envelope-forming method of claim 1 wherein;
the first tube-bending operation is performed by placing the heat-softened medial portion of the vitreous tubing against another heated arcuate-shaped mold means before the end segments of the tubing are swung toward one another, the mold means which is employed in the first bending operation constituting a first mold means and the mold means which is employed in the second bending operation constituting a second mold means, and said first mold means and the U-bent part of the tubing formed therearound are both swung as a unit through said arc during the second bending operation.

3. The envelope-forming method of claim 1 or 2 wherein;
said tubing is of substantially circular cross-section, and a pressurized stream of inert gas is introduced into the tubing, immediately after both bending operations have been completed and the tubing is still in heat-softened condition, to subject the walls of the tubing to positive pressure and thereby substantially correct any out-of-round deformities in the U-bent portions of the tubing that may have been produced by the heating and bending operations.

4. The envelope-forming method of claim 1 wherein a coating of phosphor material is deposited on the inner surface of the vitreous tubing before the tube bending operations are performed.

5. The envelope-forming method of claim 1 wherein a coating of phosphor material is deposited on the inner surface of the vitreous tubing after both of the tube bending operations have been performed and the resulting triple-U-bent envelope has cooled.

6. The envelope-forming method of claim 1 wherein;
the arcuate surface of the first mold means which contacts the vitreous tubing defines a peripheral groove that nestingly receives the tubing and thus establishes a mechanical interlock between said first mold means and the associated U-bent part of the tubing that is produced by the first bending operation, and the tube-gripping action resulting from said mechanical interlock is sufficient to permit the second tube-bending operation to be accomplished by utilizing the first mold means as the component by which the bending force for the second bending operation is applied to the first-formed U-bent portion of the tubing.

7. The envelope-forming method of claim 6 wherein;
said second mold means comprises a single mold component that bridges both leg portions of the U-shaped tubing, and the arcuate surfaces of the second mold component which contact the tubing also define peripheral grooves that nestingly receive the respective leg portions of the U-bent tube component which is produced by the first bending operation and thus serve as guide means for properly reshaping said leg portions during the second bending operation.

* * * * *

UNITED STATES PATENT AND TRADEMARK OFFICE
CERTIFICATE OF CORRECTION

PATENT NO. : 4,288,239
DATED : September 8, 1981
INVENTOR(S) : Frederick W. Hoeh, deceased It is certified that error appears in the above—identified patent and that said Letters Patent is hereby corrected as shown below:

In the face sheet, item [62], cancel ", abandoned".

Column 1, line 7, cancel ", now abandoned".

Column 1, line 21, cancel "Heoh" and insert -- Hoeh --.

Signed and Sealed this

Second Day of March 1982

[SEAL]

Attest:

GERALD J. MOSSINGHOFF

Attesting Officer

Commissioner of Patents and Trademarks